Feb. 14, 1961    R. H. CHLEBUS    2,971,417
WORK SENSING CLAMPING PRESSURE ADJUSTING MEANS
Filed Dec. 10, 1956    2 Sheets-Sheet 1
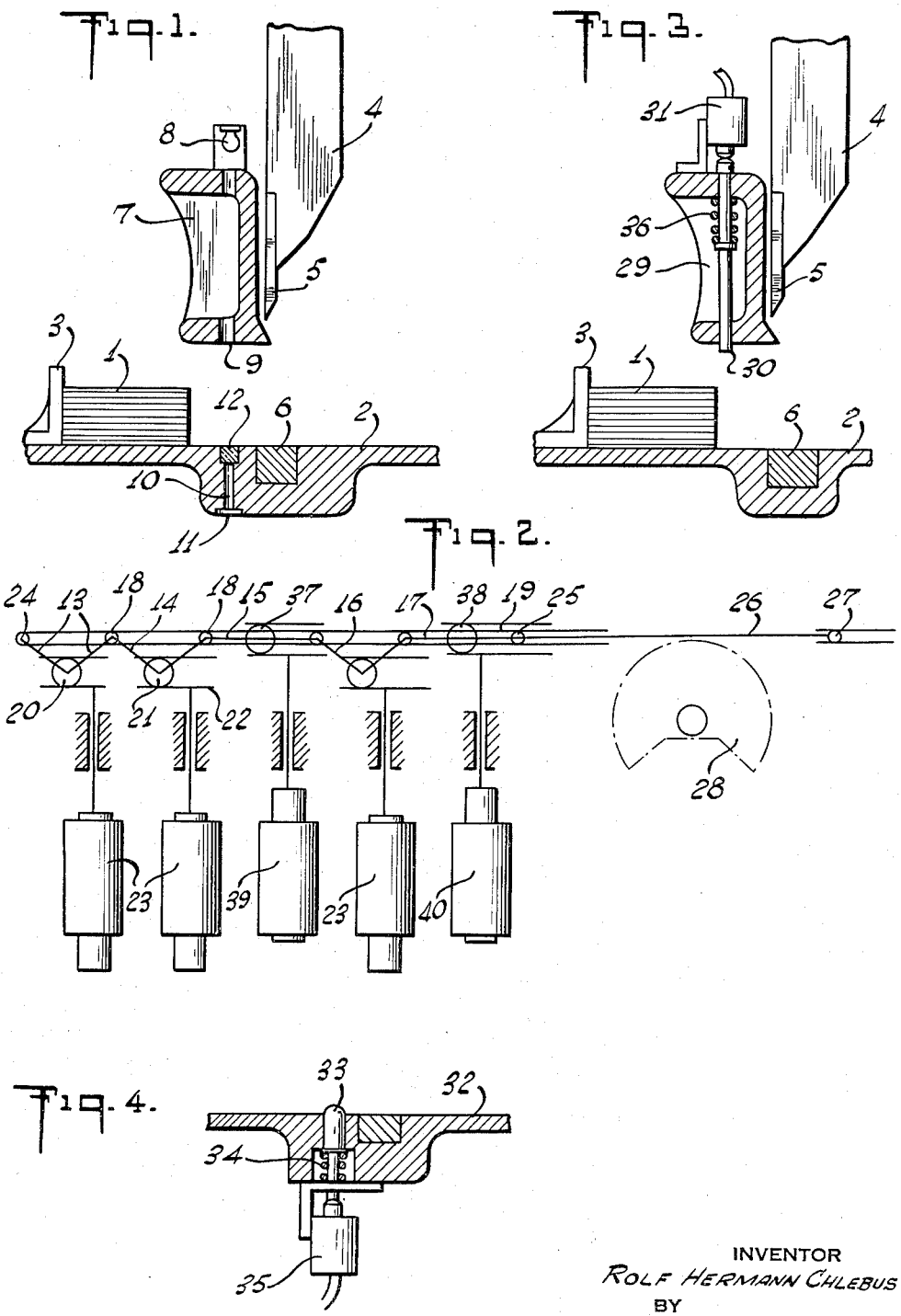
INVENTOR
ROLF HERMANN CHLEBUS
BY
ATTORNEY Feb. 14, 1961 R. H. CHLEBUS 2,971,417
WORK SENSING CLAMPING PRESSURE ADJUSTING MEANS
Filed Dec. 10, 1956 2 Sheets-Sheet 2
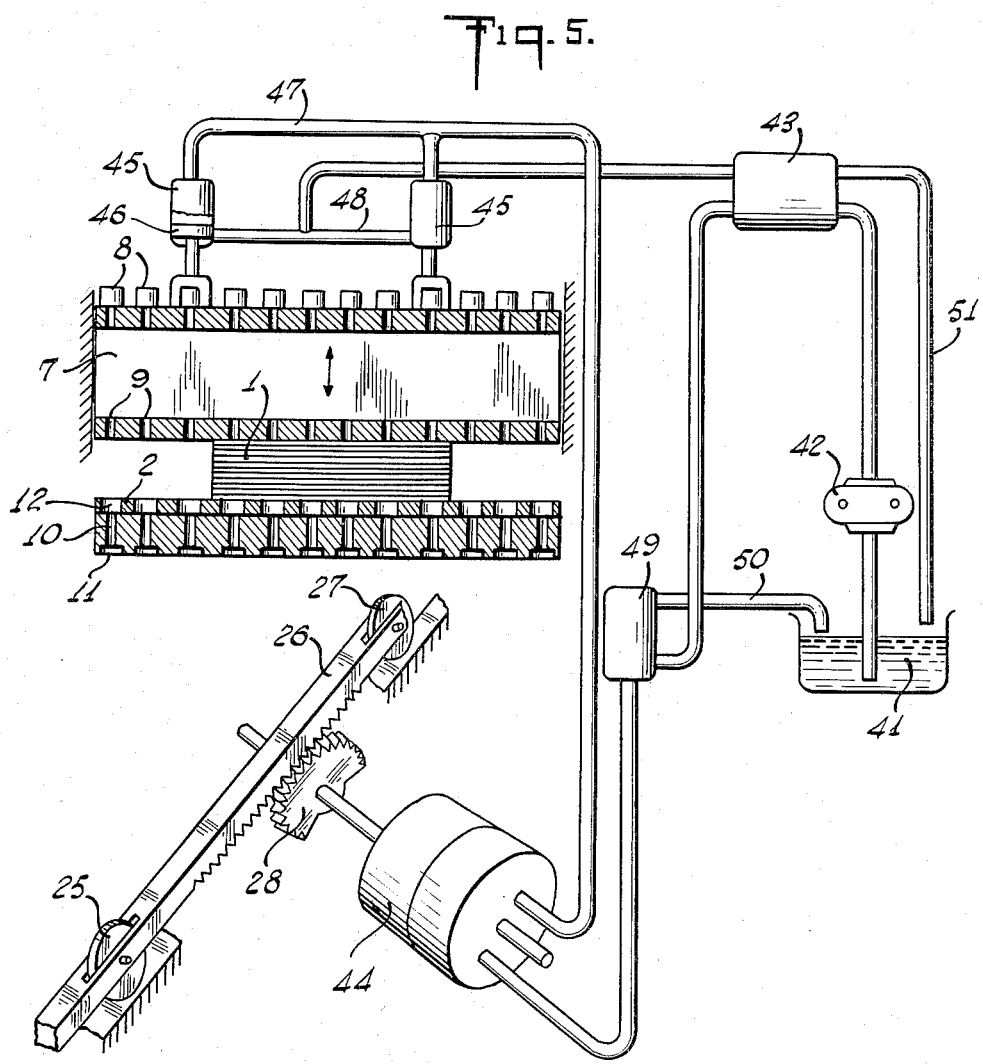
INVENTOR
ROLF HERMANN CHLEBUS
BY
ATTORNEY United States Patent Office 2,971,417
Patented Feb. 14, 1961

2,971,417
WORK SENSING CLAMPING PRESSURE ADJUSTING MEANS

Rolf Hermann Chlebus, Leipzig, Germany, assignor to VEB Leipziger Buchbindereimaschinenwerk, Leipzig, Germany Filed Dec. 10, 1956, Ser. No. 627,414

Claims priority, application Germany Aug. 16, 1956

9 Claims. (Cl. 83—364)

My machine relates to cutting machines for paper and pasteboard and is directed particularly to a cutting machine which automatically adjusts its clamping pressure in accordance with the length of the cut to be made.

In previous cutting machines for paper and pasteboard and similar sheet materials, it is known to adjust the pressing force to the desired value before beginning the cutting operation. This is especially important when cutting fragile materials and also where the piles to be successively cut are greatly different with respect to their lengths to be cut.

When piles of paper are to be cut it is necessary to compress the pile just ahead of the cutting knife by means of a pressure bar extending along the entire length of the knife. Only in this manner is it possible to obtain a satisfactory cut in a vertical direction through the pile. The pressure of the bar, however, must be adjusted according to the material to be cut and must be neither too strong nor too weak. Although this fact is known, the methods employed in the past to achieve this result have not been satisfactory. The present invention overcomes the shortcomings of the prior art. The pressure bar of the present invention, as shown in the various embodiments and examples, is equipped with sensing means adapted to adjust the bar pressure according to the length of the cut desired and at the same time according to the distance offered by the material. This result is accomplished by suitable automatic devices. These devices are described in the embodiments and are the subject matter of the claims appended hereto.

In machines with spring pressing mechanisms adjustment of the pressing force is laborious. For this reason, such machines are often provided with mechanism for mechanically adjusting the pressing pressure or the pressing pressure is produced by means of a plurality of springs selective ones of which can be switched out so as to be inoperative. Even with hydraulically operated pressing, which is comparatively easy to control, adjustment of the pressing force has up to now been accomplished by hand. This requires special attention on the part of the operator, in that before each cut he must decide to what approximate value he must adjust the pressing force. For this reason errors occasionally result in the adjustment, or adjustment is not even made.

Cutting machines are also known which automatically adjust the pressing force in accordance with the cutting resistance. Such constructions have the disadvantage that they effect the required amount of pressing force only after beginning of the cutting operation so that the first sheets of the pile are cut under inexact conditions.

It is accordingly the principal object of my invention to provide a cutting machine which automatically adjusts the clamping pressure in accordance with the length of the material to be cut as it lies on the cutting machine table, whereby the above-mentioned disadvantages are obviated. With such operation, the operator can concentrate entirely upon his work on the machine; also errors in adjustment or fixed cutting pressure differences resulting from an original pressing force which is too small are eliminated.

Further objects, features and advantages of my invention will become apparent from the following description when read with reference to the drawings. In the drawings, wherein like reference numerals denote corresponding parts throughout the several views, Fig. 1 is a side view, partly in section, of a cutting machine provided with photoelectric control means, Fig. 2 shows a driving mechanism for actuating an oil pressure control valve, Fig. 3 is a vertical view partly in section, of a cutting machine having feeler rods on the pressing bar, Fig. 4 is a partial view of a cutting machine, in vertical cross-section, having feeler bars in the cutting table; and Fig. 5 is a somewhat schematic, partly perspective and partly sectional view of the pressure control mechanism for regulating the pressure on the pressure bar.

In the embodiment of the invention according to Fig. 1, the material 1 to be cut is laid upon the table 2 of the machine against an adjustable abutment member 3. The knife 5 secured to the knife holder 4 is moved downwardly by known means, not herein described, against the cutting strip 6 fitted flush in the table 2. By means of the pressure bar 7, which is arranged to move perpendicularly to the table 2, the material pile 1 to be cut is pressed together. A plurality of light sources 8 are distributed over the entire length above the pressure bar 7, said light sources preferably being fixed with respect to the machine frame. The light rays from the light sources 8 fall through holes 9 and 10, which are arranged perpendicularly under the lamps 8 in the pressure bar 7 and the table 2, upon the photocells 11 arranged underneath the table. The holes 10 in the table 2 are covered with transparent plugs 12.

Fig. 2 shows a series of knee levers 13 through 17 whose lever junction points 18 are guided in a channel 19. Rollers 21 are provided at each of the linking points 20. The rollers 21 rest on slide bars 22 which are actuated by means of the lifting magnets 23. The left end point 24 of this series is secured to the machine frame while the right end point 25 connects with a toothed bar or rack 26 which at its other end moves in a guide channel 27. The oil pressure control includes a toothed segment which meshes with the rack 26. The solenoids 23 are energized as long as the clamping pressure persists and the switches 31, 35 are closed. They are then in positions 39, 40 and at the same time the rollers remain with their levers extended in positions 37, 38. When the clamping pressure subsides the solenoids are deenergized, fall back, and resume position 23. The angle or knee levers are thereby returned to the bent or angle position.

In the embodiment of the invention according to Fig. 3, the pressure bar 29 of the machine is provided with a plurality of feeler rods 30 which at their lower ends extend a small distance below the pressing surface of said pressure bar. The feeler rods 30 are held in the position shown in the drawing by means of compression springs 36. Switches 31 are secured upon the pressure bar 29 above each of the feeler rods 30 to be actuated upon upward movement of said rods. These switches thereby close a circuit by means of relays (not shown in the drawing) and energize solenoids 23 for moving angle levers 13, 14 and 16 into an extended position such as that illustrated for levers 15 and 17.

In the embodiment of the invention shown in Fig. 4, feeler rods 33 are provided in the table 32 of the machine which are subject to the operation of compression springs 34. Switches 35 are arranged under each of these feeler rods 33 to be actuated upon downward movement of said rods. These switches are adapted to close a circuit when pressure is exerted on sensing rod 33, whereby by means of a relay (not shown) solenoids 23 are energized and the angle levers 13, 14 and 16 are forced into an extended position such as that illustrated for levers 15 and 17.

The operation of the embodiments of the invention according to Figs. 1 and 2 is as follows: At the beginning of the cutting operation, the light sources 8 are switched on. Light thereupon falls through the openings 9 in the pressure bar 7 and the holes 10 in the table 2, upon the photocells 11. The photocells respond and switch in the lifting magnets 23 through electrical relays (not shown). The slide bars 22 are thereby lifted upwardly. Thereupon, the rollers 21 which are connected at the linking points of the knee levers 13 through 17 and which are engaged in the guiding channel 19, reach their extended positions, as shown for knee levers 15 and 17. The rack 26 thereupon moves to its utmost position to the right and in this way brings the oil pressure control valve 28 into the position for slightest pressure. As soon as the material pile to be cut is shoved under the pressure bar, those photocells 11 fall out whose light impinging thereon from the light sources 8 is shut out. Thereupon the corresponding lifting magnets 23 fall out to pull their respective knee levers into bent position, as shown for knee levers 13, 14 and 16. The oil pressure control valve thus adjusts itself automatically to a pressing force which corresponds exactly to the length of the cut to be made and, in the extreme case, to the greatest pressure.

In the embodiment of the invention illustrated in Fig. 3, the feeler rods 30, upon the pressure bar 29 resting upon the material to be cut, are lifted at each position where they project out of the pressure bar. This happens only to those rods which come to rest upon the material to be cut. Upon lifting up of these rods, the knee levers according to Fig. 2, are brought into extended position and thereby the oil pressure of the hydraulic arrangement is controlled in the manner already described, except that the control valve in this case works reversely. This is accomplished by use of the switches 31.

In the embodiment of the invention shown in Fig. 4, the feeler rods 33 arranged in the table 32 of the machine are pressed downwardly when the pile comes to lie upon them. Thereupon, over switches 35, either the hydraulic pressing force is controlled in the manner illustrated in Fig. 2, or individual springs are connected in a corresponding amount in a known spring pressure arrangement.

It is thus effected that the pressing force is adjusted in accordance with the length of the material to be cut before the cutting operation. Additionally, control handles are only necessary when a given cutting material requires an especially high or an especially low pressing force. Thereupon the machine is adjusted as formerly, for example by an additional hand actuated oil pressure control valve or by certain pressure springs being switched in or switched out.

A pile of sheet material 1 to be cut is placed on the table 2 and moved below the pressure bar 7. The machine is started and the bar 7 descends on the pile 1. The sensing means then accurately positions the rack 26 in accordance with the length of the sheet 1, and hence rotates the segment 28 to set an oil control valve 44. A geared pump 42 is provided for producing the required pressure and it takes suction out of reservoir 41 and conveys oil to two pressure cylinders 45, by way of a reversing valve 43, overflow valve 49 and a pipe line 47. In the cylinders 45, the oil acts by means of piston 46 on the pressure bar 7 when, as indicated in Fig. 5, not all the holes 12 and table 2 are covered by the pile 1. The rays from the light source 8 pass through the uncovered holes 9, 12 and 10 to the photocells 11 and cause current to flow which energizes the associated lifting magnet 23 by means of relays (not shown). The lifting magnets thereby move the slide bars 22 and the rollers 21 and effect a change of the positioning of the rack 26. Depending upon the positioning of the rack 26, the toothed segment 28 is rotated to change the position of the control valve 44. A rotary slide in the control valve 44 throttles the oil supply to pressure cylinders 45 via the overflow valve 49 and line 47. Thus the pressure of the bar 7 on the pile 1 would be decreased. After the cutting operation is performed, a reversing valve 43 changes the flow of oil. Oil is admitted under pressure then to the underside of the pistons 46 over the line 48. The oil above the pistons 46 drains through the line 47, valve 43 and line 51 into the reservoir of 41. Since the output of the gear pump 42 is constant, a damming up of oil will arise upon throttling of the oil flow by control valve 44. Excess oil is admitted to the reservoir 41 by the overflow valve 49 over line 50.

In order that the feeler rods 30, 33 will not hinder the inward movement of the cutting material, the projecting ends thereof are so rounded and the stroke is maintained at such a small amount that the material will not be caught. It is also possible to construct the machine so that the feeler rods do not extend outwardly from the pressure bar table in the beginning position, but that they are so moved at first by actuation of the machine. Thereupon by the lifting movement of the underneath rods being hindered by the material pile, or upon the perpendicular movement of the upper rods being again lifted up by setting upon of the pressure bar, a corresponding control of the pressing force before the beginning of the cutting operation can be effected. Also, the photocell control units can be so arranged that they become operable first upon actuation of the machine. The means of these various modifications can, in other respects, be the same as shown in the illustrated embodiments. These examples also are subject to many other changes. For instance, instead of the series of knee levers as shown in Fig. 2, other types of control means can naturally also be chosen. It is possible, for example, that each lifting magnet can directly effect hydraulic control, and that these controls in their operation can add to the required pressure value. Additionally, the control of the pressing force can also be effected by means of high frequency or ultrasonic energy instead of through the use of photocells as illustrated, as soon as the material to be cut extends under the pressure bar.

The essential feature of the invention resides in the fact that means is provided in paper cutting machines to automatically set the pressing force in accordance with the length of the material to be cut which lies upon the machine table before beginning the cutting operation. The pressing force can be produced in any desired manner, be it hydraulic, pneumatic or mechanical. In the latter case, for example with spring or friction pressure devices, the adjustment of the pressing force can also be effected by means of an electric motor. In this case, the feeler rods arranged in the table of the machine can be, for example, actuated by electrical contacts which drive the motor through an exact turning motion and so regulate the pressing force upon the length of the material to be cut by a corresponding amount.

In principle, the control of the pressure force can also be effected with the help of suction or air pressure. In such cases, canals are provided in the table of the machine or in the pressure bar which, through laying upon of the material to be cut, or upon being pressed upon, are cut off. In this way, the amount of pressure force is indirectly controlled by means of air pressure or suction differentials. As hereinabove described, the advantages of the invention reside in that the pressing force in each case is controlled by the length of the pile of material to be cut, this pressure being all the more exact, the more feeler rods or photocells that are used. The machine operator need no longer consider the adjustment of the pressing force in his work, as it follows fully automatically. The operator can thereby work more swiftly. Also, with short lengths of material to be cut, marking of the material by the pressure bar is eliminated and, with great lengths of material to be cut, the possibility of having insufficient pressure is eliminated.

While I have described and illustrated preferred embodiments of my invention, it is to be understood that this disclosure is for the purpose of illustration only and that various omissions, or changes in arrangement of parts, as well as the substitution of equivalent elements for those herein shown and described, can be made without departing from the spirit and scope of the invention as defined in the following claims.

What I claim is:

1. An automatic pressure control device for paper and the like sheet cutting machines having a cutting table, and a transverse pressure bar and cutting knife each reciprocally arranged in parallel relation above the cutting table, means for moving said cutting knife toward said cutting table on its cutting strokes for successively cutting piles of sheet material fed along the table, means for moving said pressure bar toward said cutting table in advance of said cutting knife to clamp said piles of sheet material, means for controlling the clamping pressure of said last named means, comprising a plurality of sensing means arranged in spaced relation longitudinally of and substantially coextensive with said pressure bar, each of said sensing means being operative to be actuated in dependence upon the pile of sheet material along which the cut is to be made directly thereunder, and means controlled jointly by the actuation of said sensing means for adjusting the pressure applied by said pressure bar to said pile of material prior to the cutting operation.

2. The automatic pressure control device defined in claim 1 wherein each of said sensing means comprises a light source arranged above said pressure bar, a vertical opening in said pressure bar for passage of light from said light source, an aligned opening in said table for passage of light from said light source and a photo-sensitive unit arranged beneath said table for actuation by light passing through said table opening, said pressure adjusting means comprising a plurality of relays, one each controlled by one each of said photo-sensitive units.

3. The automatic pressure control device defined in claim 1 wherein each of said sensing means comprises a plurality of pins arranged for vertical sliding motion in said pressure bar, one end of each of said pins normally extending out of the underside of said pressure bar, and an electric switch arranged above each of said pins and operative to be actuated when its corresponding pin is pressed upwardly upon contact with the material to be cut, said pressure adjusting means comprising a plurality of relays, one each controlled by one each of said switches.

4. The automatic pressure control device defined in claim 1 wherein each of said sensing means comprises a plurality of pins arranged for vertical sliding motion in said table, one end of each of said pins normally extending out of the top surface of said table, and an electric switch arranged below each of said pins and operative to be actuated when its corresponding pin is pressed downwardly upon contact with the material to be cut, said pressure adjusting means comprising a plurality of relays, one each controlled by one each of said switches.

5. An automatic pressure control device for paper and similar cutting machines, comprising a cutting table, a reciprocatable pressure bar, a reciprocatable knife adjacent said pressure bar, means for moving said cutting knife toward said table on its cutting movement for cutting piles of sheet material positioned thereon, means for applying downward pressure on said pressure bar, sensing means spaced along said table lengthwise of the line of cutting subject to separate actuation by positioning of sheet material thereon jointly controlling the downward pressure applying means to vary the pressure thereon in proportion to the number of sensing means contacted by said sheet material.

6. An automatic pressure control device according to claim 5, wherein said sensing means is a photo-electric cell.

7. An automatic pressure control device according to claim 5, wherein said sensing means is an upwardly biased contact member and including a second contact member positioned in alignment therewith and connected to said pressure bar pressure applying means, said first contact member being movable upon positioning of sheet material thereon unto contact with said second contact for actuation of said pressure applying means.

8. An automatic pressure control device for sheet cutting machines adapted to cut sheets of material such as paper and the like and including a cutting table, a transverse pressure bar and a cutting knife each reciprocably arranged in parallel relation above the cutting table for successively cutting piles of sheet material fed along the table, comprising, a plurality of sensing means arranged in spaced relationship along the line of cutting and substantially coextensive with said pressure bar, each of said sensing means being operative to be separately actuated in dependence upon the length of the material along which the cut is to be made, hydraulic valve means connected to said pressure bar for effecting clamping pressure thereon, translatory rack means connected to said sensing means and said hydraulic valve means and movable in response to the number of said sensing means actuated to control the degree of operation of said hydraulic valve means.

9. An automatic pressure control device for sheet cutting machines having a cutting table, and a transverse pressure bar and cutting knife each reciprocally arranged in parallel relation above the cutting table for successively cutting piles of sheet material fed along the table, comprising hydraulic valve means connected to said pressure bar for applying clamping pressure to said pressure bar, and sensing means arranged along the line of cutting connected to said hydraulic valve means and including a plurality of knee levers linked in series, guide channel means for constraining the linking points of said plurality of knee levers to translatory motion, one end of said plurality of series-connected knee levers being constrained against motion in said guide channel means, and the other end thereof being connected to said hydraulic valve means, said sensing means dependent upon the length of paper placed on said table on the line of cut being effective to move a proportionate number of said plurality of said knee levers toward the guide channel means and to correspondingly actuate said hydraulic valve means in a corresponding degree for controlling the pressure applied to said pressure bar.

References Cited in the file of this patent

UNITED STATES PATENTS

| | | |
|---|---|---|
| Re. 20,511 | Hudson | Sept. 21, 1937 |
| 1,959,851 | Biggert | May 22, 1934 |